United States Patent [19]

McKay

[11] Patent Number: 4,693,631

[45] Date of Patent: Sep. 15, 1987

[54] FLOATING BREAKWATER

[75] Inventor: Robert J. McKay, Pullenvale, Australia

[73] Assignee: Pacific Marina Developments Pty. Ltd., Australia

[21] Appl. No.: 886,493

[22] Filed: Jul. 17, 1986

Related U.S. Application Data

[63] Continuation-in-part of Ser. No. 771,083, Aug. 30, 1985, abandoned.

[30] Foreign Application Priority Data

Aug. 30, 1984 [AU] Australia ............................. PG6847

[51] Int. Cl.$^4$ ............................................... E02B 3/04
[52] U.S. Cl. ......................................... 405/26; 405/21
[58] Field of Search ..................................... 405/24–26, 405/21, 23; 114/266, 263

[56] References Cited

U.S. PATENT DOCUMENTS

| | | | |
|---|---|---|---|
| 3,691,774 | 9/1972 | Hard | 405/26 |
| 3,799,093 | 3/1974 | Thomson | 114/266 |
| 3,969,901 | 7/1976 | Matsudaira et al. | 405/26 X |
| 4,023,370 | 5/1977 | Watson | 405/26 |
| 4,234,266 | 11/1980 | Angioletti | 405/26 |
| 4,318,361 | 3/1982 | Sluys | 114/266 X |
| 4,318,362 | 3/1982 | Jung | 114/266 |
| 4,470,365 | 9/1984 | Sluys | 114/266 |

Primary Examiner—Dennis L. Taylor
Attorney, Agent, or Firm—Sughrue, Mion, Zinn, Macpeak, and Seas

[57] ABSTRACT

A floating breakwater is constructed from a plurality of interconnected modules each having an internal core formed from floatable material and an external sheath formed from settable material. Each module is provided with a pair of oppositely extending flanges which abut the respective flanges of adjacent modules and all of the modules are secured together to define a continuous block by means of front and rear continuous strips which are secured to the modules by means of elongated fasteners. A plurality of finger modules extend outwardly from the continuous block in spaced relation and a continuous finger strip is secured to the outermost end portions of each of the fingers. A beam is secured between each pair of adjacent modules beneath the abutting flanges. Each beam extends outwardly between the spaced apart fingers and is secured to each of the strips to strengthen the floating breakwater.

3 Claims, 7 Drawing Figures

FLOATING BREAKWATER

CROSS REFERENCE TO RELATED APPLICATION

This application is a continuation-in-part of application Ser. No. 771,083, filed Aug. 30, 1985, now abandoned.

BACKGROUND OF THE INVENTION

This invention relates to a floating breakwater suitable for use in harbors for inhibiting wave action thereby providing a sheltered mooring location for boats and the like.

Floating breakwaters are mooring structures that float at or near the water surface and cause incident wave energy to be dissipated by reflection, turbulence, drag, damping or other suitable means thereby causing wave heights to be reduced on the leeward side.

Conventional floating breakwaters for the above mentioned purpose have included one type formed by a multiplicity of floating tires linked together by chain links, poles or rope and which are designed to cover a relatively large area. While such floating breakwaters have been found to be relatively inexpensive it has also been found that they require a high degree of maintenance and are also particularly susceptible to storm damage.

Another type of floating breakwater includes the use of large rectangular or doughnut shaped concrete pontoons arranged in single rows or double parallel rows to present a flat or planar surface to wave action. The pontoons were normally anchored with piles or moored to anchor blocks with chains or rope. However, it has been found if the wave heights exceeded three feet the use of concrete pontoons was disadvantageous because the articulated joints between the pontoons were highly stressed and often were broken. Thus failure of the articulated joints was common.

In addition to the aforementioned disadvantages the conventional floating breakwaters as described above were subject to unsatisfactory performance in regard to insufficient attentuation of transmitted waves. Also structural failures and mooring failures were common.

SUMMARY OF THE INVENTION

It is the object of the invention to provide a floating breakwater which alleviates the problems of conventional floating breakwaters described above.

The floating breakwater of the invention comprises a rear continuous block suitably formed from concrete or other settable material and preferably having an internal core formed from polystyrene or other floatable material such as polyethylene or the like. Preferably the continuous block may be formed from a plurality of modules of standard lengths that may be attached to each other in any suitable manner such as by attachment of elongate interconnection strips or timber whalers on each side of the continuous block. The modules may be abutting each other or may be slightly spaced apart. Elongate fasteners such as through bolts may then be used to interconnect a pair of opposed whalers on each side of the continuous block.

Preferably each module may be formed in a mold which initially supports the internal core by wedges or the like so that the core is spaced from the inner surface of the mold. Thereafter a metal (usually steel or iron) reinforcing mesh may be located on top of the internal core and plurality of tubes formed suitably from plastics material interposed between the internal core and the reinforcing mesh. Thereafter concrete may be poured into the mold so as to fill up the space between the internal core and the inner surface thereof. Thereafter concrete may be poured onto the top surface of the internal core so as to form a top wall of the module enclosing the reinforcing mesh and a plurality of tubes formed from plastics material.

The breakwater may also include a plurality of outwardly extending fingers or projections which preferably are equally spaced along the length of the continuous block. The fingers may be attached to the continous block in any suitable manner such as by elongate fasteners such as through bolts extending through the rear continuous block and the length of each finger. It is also preferred that the spaces between adjacent fingers are approximately equal to the width of the fingers.

The fingers again may be formed in modules or standard shapes or lengths and if desired may comprise a similar shape to the modules comprising the continuous block. Preferably the continuous block is rectangular but this is not essential.

There also may be provided a front interconnection strip or beam which is oriented substantially parallel to the interconnection strips described above in regard to the rear continuous block.

It is also desirable that there be provided a plurality of transverse beams which interconnect the front interconnection strip and which may extend rearwardly of the rear continuous block and which may also be suitably attached to both of the interconnection strips associated with the rear continuous block. In this embodiment each transverse beam may extend from the front interconnection strip and be interposed between adjacent fingers so that the transverse beam may also extend between adjacent modules of the rear continuous block.

The provision of the aforementioned transverse beams is advantageous in that they enable the floating breakwater to have a stiffening function and thus inhibit movement of the fingers relative to the rear continuous block. Without the transverse beams it is possible for the fingers to move up and down or undergo vertical oscillations relative to the rear continuous block under wave action.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
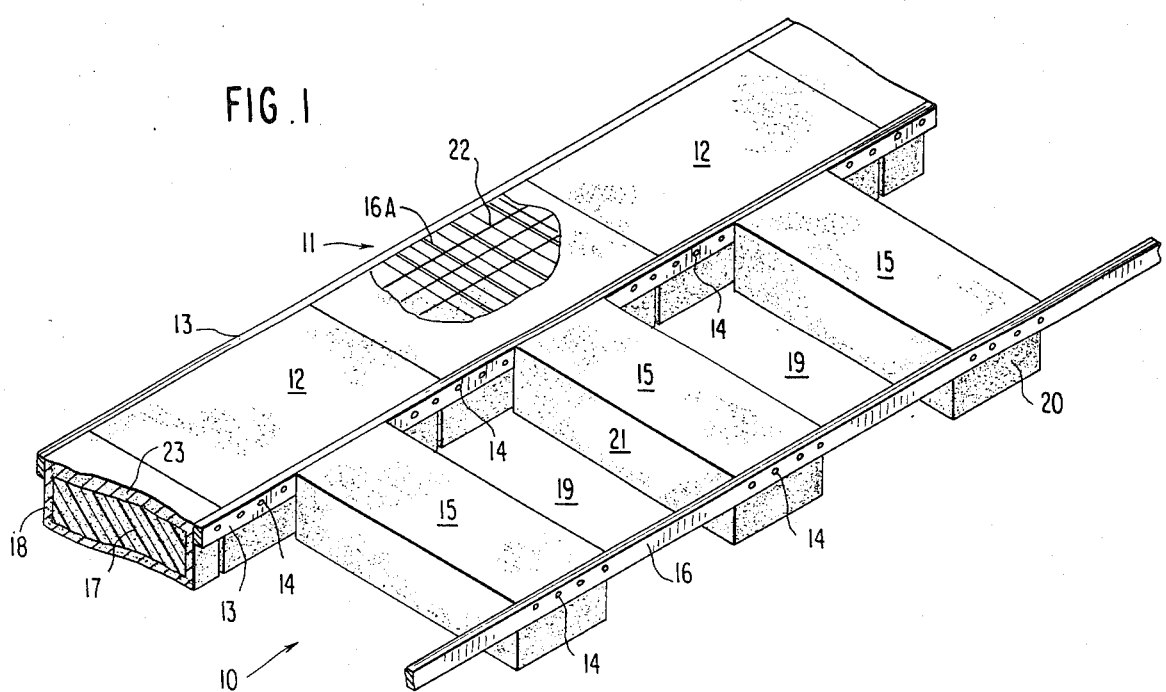
FIG. 1 is a perspective view of a floating breakwater constructed in accordance with the present invention.

The breakwater 10 in the drawings includes a rear continuous block 11 formed by a plurality of adjacent modules 12 which may be formed as described above and which are all manufactured in standard lengths. There is also shown opposed timber interconnection strips or whalers 13 which are located on the front and rear side of block 11 and which are attached thereto by bolts 14.

Also shown are outwardly extending fingers or projections 15 which may be formed in standard lengths similar or different to modules 12. Also shown is a front interconnection strip or whaler 16 attached to fingers 15 by bolts 14. The fingers 15 may also be formed with plastics internal tubes 16A as is the case with modules 12 in the manner described above which may be aligned or oriented with each other so as to facilitate the insertion of connection bolts 14 to attach the fingers 15 to block 11. Each module 12 may have an internal core of foam material 17 and an outer sheath of concrete 18. Included in a top wall or layer 23 of sheath 18 are the plastics tubes 16A and reinforcing mesh 22. Located between each finger are recesses 19.

It will be appreciated that the fingers 15 may be oriented to the longitudinal axis of block 11 at any appropriate angle suitably between five degrees and fifteen degrees for example. However it is preferred that fingers 15 extend at right angles to the longitudinal axis of block 11.

The floating breakwater of the invention may be anchored by any suitable means such as by a rope (preferably formed from nylon) or chain to a stub pile driving into the ground or a heavy weight. Alternatively for more shallow water the breakwater may have attached thereto appropriate support brackets which have rollers engageable in appropriate tracks in anchor piles driven into the ground.

The essence of the invention is based upon the discovery that by the establishment of a rear continuous block and frontwardly extending fingers that the impact of the waves will be broken upon impingement upon the front surfaces 20 of fingers 15 and that when the waves extend into the recesses 19 that they will also impinge upon the opposed side surfaces 21 of recesses 19 so as to form an interference pattern which will result in at least partial cancellation of the wave trains created. This provides a simple and very effective breakwater system.

It will also be appreciated that the fingers 15 instead of being rectangular as illustrated may adopt any other convenient shape such as trapezoidal, triangular or polygonal. However the rectangular shape is preferred for ease of manaufacture. Also the fingers 15 do not have to have the same length as illustrated but may have different lengths if required.

Also in variation of the above, the through bolts may extend longitudinally of the block 11 instead of transversely as shown and the fingers 15 may be attached to the block 11 in any other suitable manner such as by welding of adjacent metal plates or by bolting together adjacent attachment brackets.

In the modified arrangement as shown in FIGS. 4–7 there is shown a rear continuous block formed by modules 12A which are each separated by transverse beams 24, which are attached to front strip 16 at 25, to a pair of intermediate strips 13A at 26 and to a rear strip 13A at 27.

Figure 5:
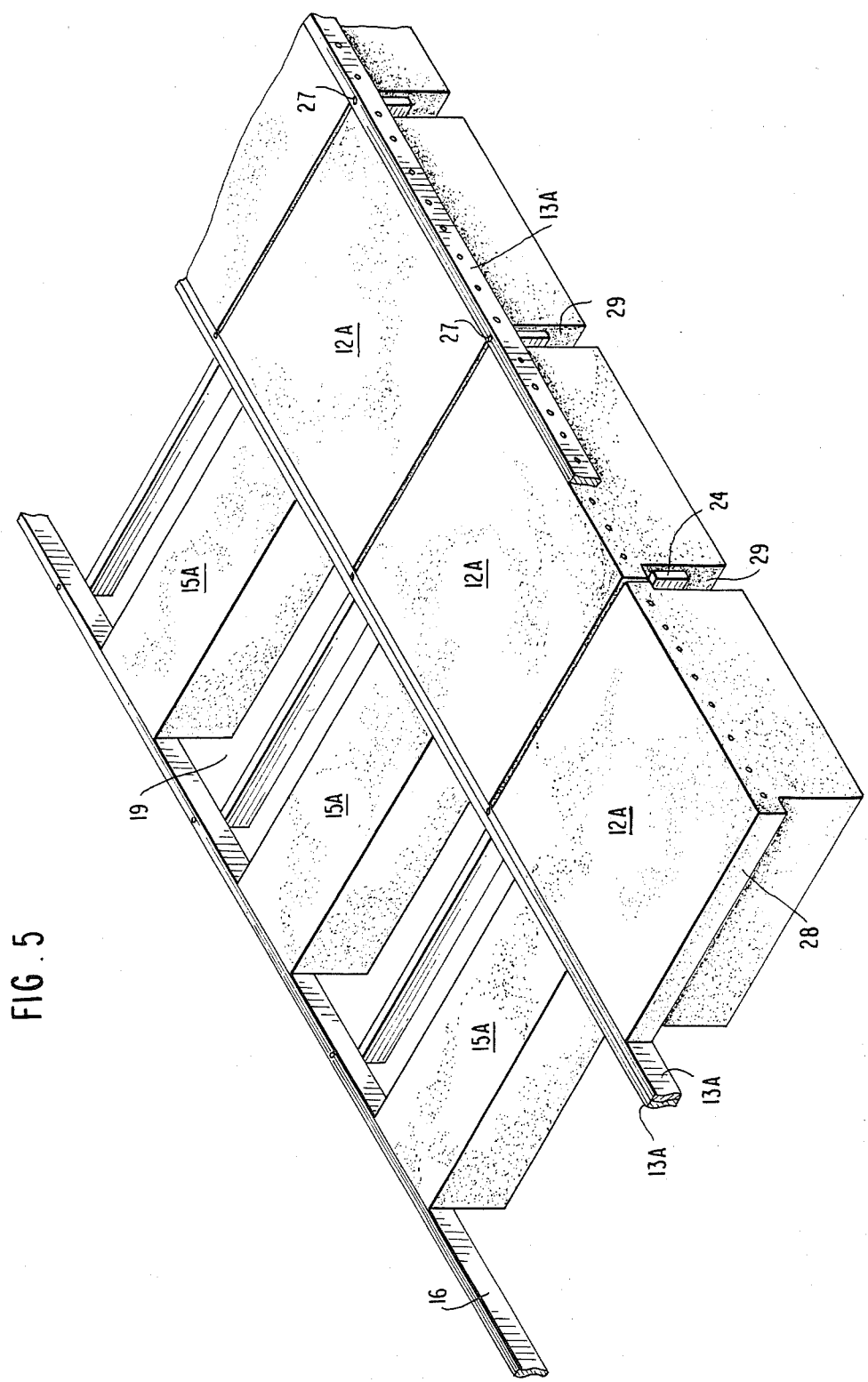
FIG. 5 is is a rear perspective vie of the floating breakwater shown in FIG. 4.

As best shown in FIG. 5 each transverse beam 24 extends in recesses 29 which are formed between abutting modules 12A as shown. In this arrangment each module 12A is provided with a pair of side flanges 28 which abut as shown above an adjacent recess 29.

Figure 3:
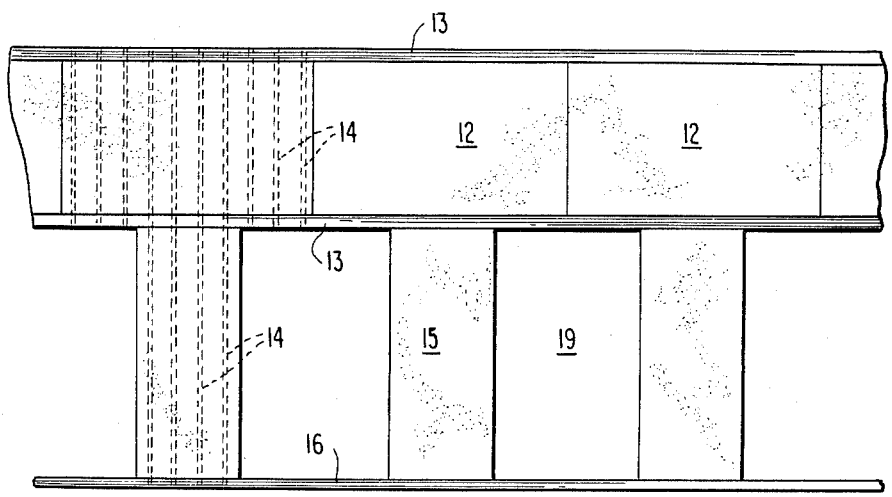
FIG. 3 is a plan view of the breakwater shown in FIG. 1.
Figure 2:
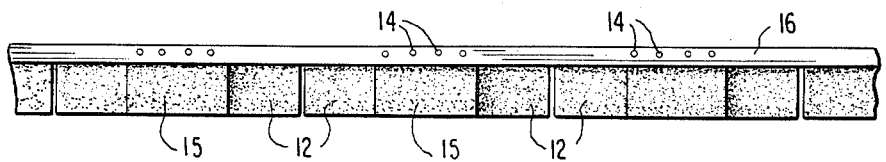
FIG. 2 is a front view of the breakwater shown in FIG. 1.
Figure 4:
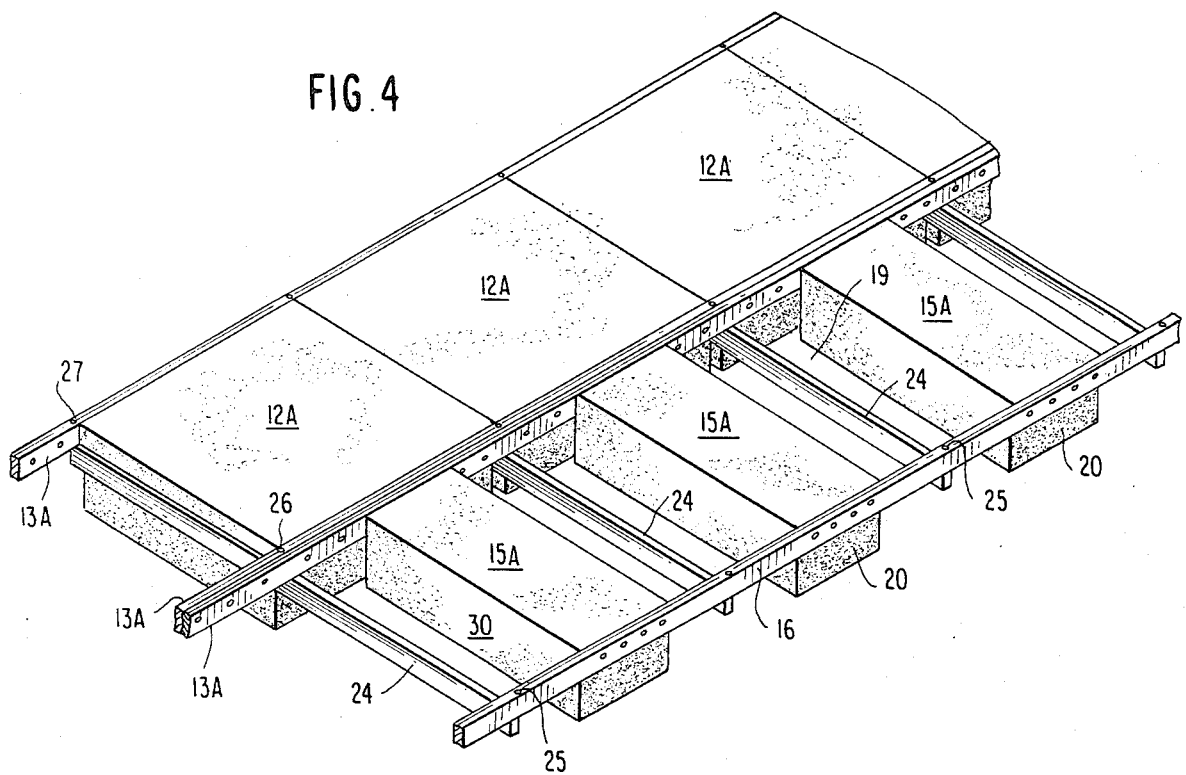
FIG. 4 is a front perspective view of a modified floating breakwater constructed in accordance with the invention.
Figure 6:
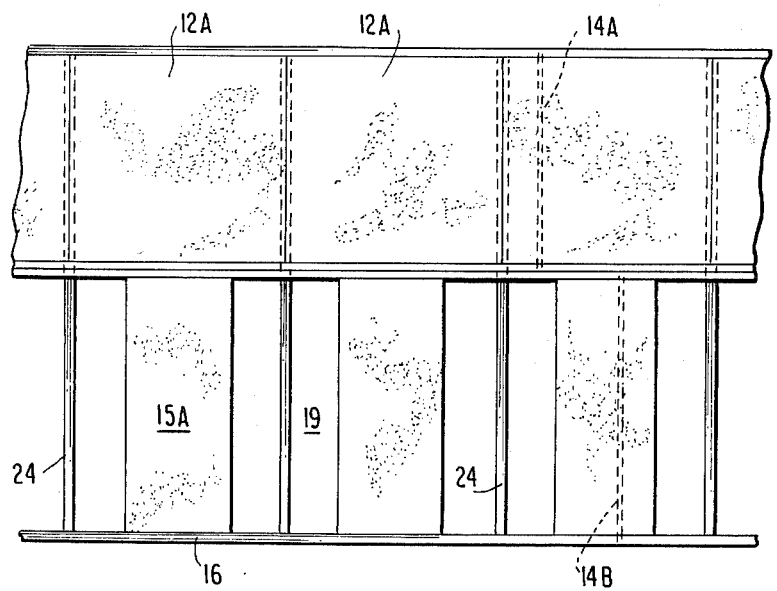
FIG. 6 is a plan view of the floating breakwater shown in FIG. 4.

In FIG. 6, instead of through bolts 14 each extending through adjacent modules 12 and 15 as shown in FIGS. 1–3, it is also appropriate in some cases to use separate through bolts wherein through bolts 14A may be used to interconnect rear strip 13A and intermediate strip 13A through modules 12A and through bolts 14B may be used to interconnect front strip 16 and one of the intermediate strips 13A. Thus through bolts 14A and 14B do not connect with each other in the embodiment shown in FIG. 6.

Figure 7:
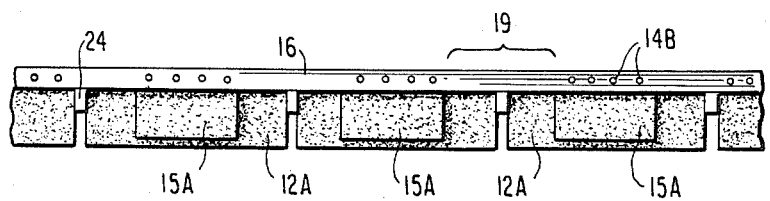
FIG. 7 is a front view of the floating breakwater shown in FIG. 4.

Also as best shown in FIGS. 6–7, it is preferred that the width of fingers 15A are approximately equal to the spacing 19 between individual fingers 15A.

In the arrangement shown in FIGS. 4–7 the floating breakwater shown is a rigid structure and both the fingers 12A and modules 15A are inhibited from relative movement especially by the incorporation of beams 24.

The provision of the front strip 16 is mainly responsible for causing wave turbulence and in tests carried out with a full scale prototype strip 16 caused approximately fifty percent of any wave front higher than 15 inches to break and spill over the strip 16 into spaces 19 thus causing a high degree of turbulence. Spaces 19 also promote turbulence as also is the case with beams 24.

In regard to reflection of waves in relation to waves incident on the floating breakwater at ninety degrees such waves were found to be reflected by the outer fingers 15A, strip 16 and the rear continuous block formed by modules 12A. In relation to wave incidence at angles other than ninety degrees reflection of these waves occurred through the agency of end surfaces 20 of fingers 15A, side surfaces 30 of fingers 15A, beams 24 and the rear continuous block.

In regard to the relatively large surface area exposed to the water by the present invention, especially in comparison with the aforementioned conventional concrete pontoons it was noticed that a drag effect was obtained which was previously only obtainable with the aforementioned conventional breakwaters formed by a multiplicity of floating tires.

A damping effect was also obtained which could be attributed to the mass of the total structure and in particular the rear continuous block.

Other advantages obtainable by the floating breakwater of the invention are set out below.

Response: Because the buoyancy of the outward extended fingers is approximately fifty percent less than the rear continuous block the whole structure does not oscillate about its longitudinal axis as is common with other concrete pontoon floating breakwaters. An oscillation of this type tends to allow waves to pass through the breakwater.

Mooring Forces: The staggered profile presented to the incoming waves reduces the forces on the moorings. If the outward extending fingers are so dimensioned to have a length equivalent to a half wave length the pressure forces are out of place by one hundred degrees.

Cost: As all components used for the present invention can be "off the shelf" items in normal use for the construction of regular floating marinas, the cost of this breakwater is minimal.

Maintenance: The concrete encased pontoon type floating marinas have proven to require minimal maintenance and as the construction of the present invention is similar the maintenance of this invention will also be minimal.

Damage: As there are no articulated joints and the whole structure has a controlled flexibility, the power to withstand storm damage of the present invention is better than other floating breakwaters in use.

Combination Floating Breakwater and Marina Berths: Because the structure of the present invention can be made from regular pontoons, the rear continuous block can have regular fingers attached on the leeward side to form marina berths. This further improves the performance of the structure as a wave attenuator and also reduces overall costs of marina berths. The seaward side of the floating breakwater can also be used for temporary mooring of boats during calm water periods.

It will also be appreciated that a plurality of front strips 16 may be used instead of the single strip illustrated and the same applies for intermediate strips 13 or 13A and rear strips 13 or 13A. It also will be appreciated that a plurality of beams 24 may also be utilized which may extend through a respective spacing 19.

While the invention has been particularly shown and described with reference to preferred embodiments thereof it will be udnerstood by those in the art that the foregoing and other changes in form and details may be made therein without departing from the spirit and scope of the invention.

What is claimed is:

1. A breakwater comprising a rear continuous block formed by a plurality of modules in abutting relation wherein each module has an internal sheath formed from floatable material and an external core formed from concrete, a rear block interconnection strip contacting each rear surface of said module of said continuous block and a front block interconnection strip contacting each front surface of said modules of said continuous block, a first plurality of elongated fasteners extending through and interconnecting said modules and said front and rear block interconnection strips, a plurality of spaced apart fingers each having a construction similar to the construction of each module disposed in engagement with said front block interconnection strip and extending outwardly away from said rear continuous block, a continuous finger interconnection strip contacting the front surface of each of said fingers and a second plurality of elongated fasteners extending through and interconnecting said strips, said fingers, and said rear continuous block.

2. A floating breakwater as set forth in claim 1 wherein each of said modules is provided with a pair of oppositely extending side flanges adjacent the upper surface of each module and disposed in engagement with respectie flanges of adjacent modules when said modules are disposed in abutting relationship to define said rear continuous block, an elongated beam secured between each pair of adjacent modules beneath said abutting flanges and extending outwardly from said rear continuous block in spaced parallel relation to said fingers and means securing said beam to said modules and each of said strips to strengthen said floating breakwater.

3. A floating breakwater as set forth in claim 2 wherein each of said fingers have an identical width approximately equal to the spacing between individual fingers.

* * * * *